March 26, 1963     W. H. HOWE     3,083,321
DOMINANT SIGNAL SELECTING APPARATUS
Filed March 22, 1960
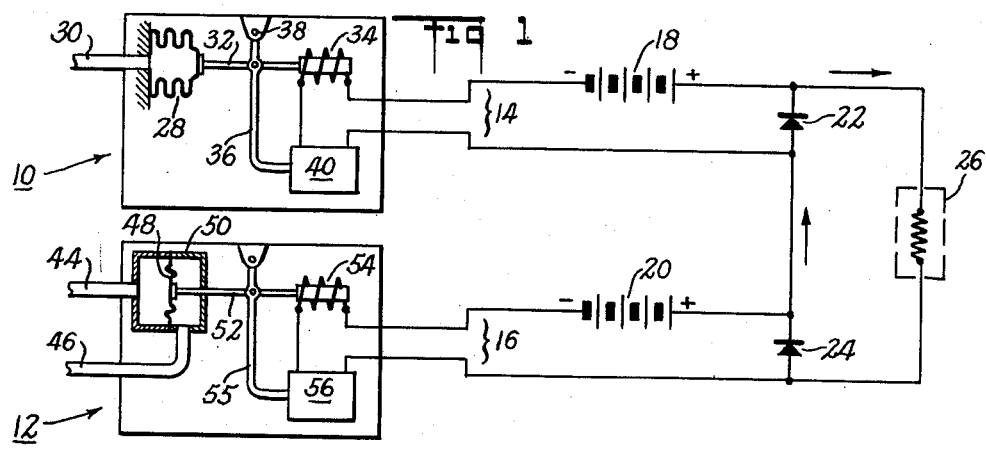
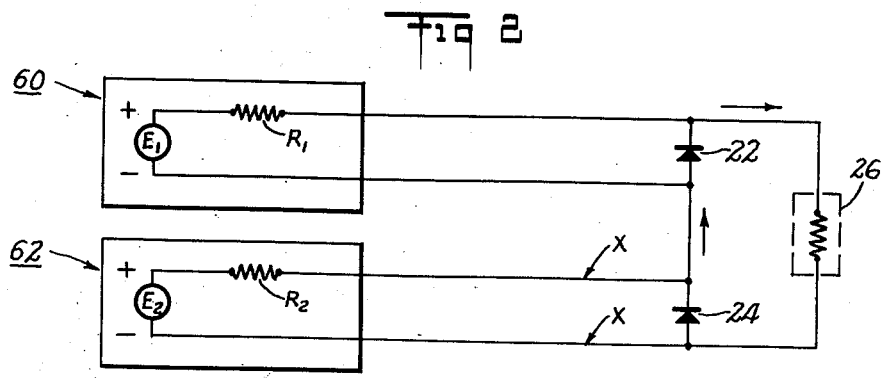
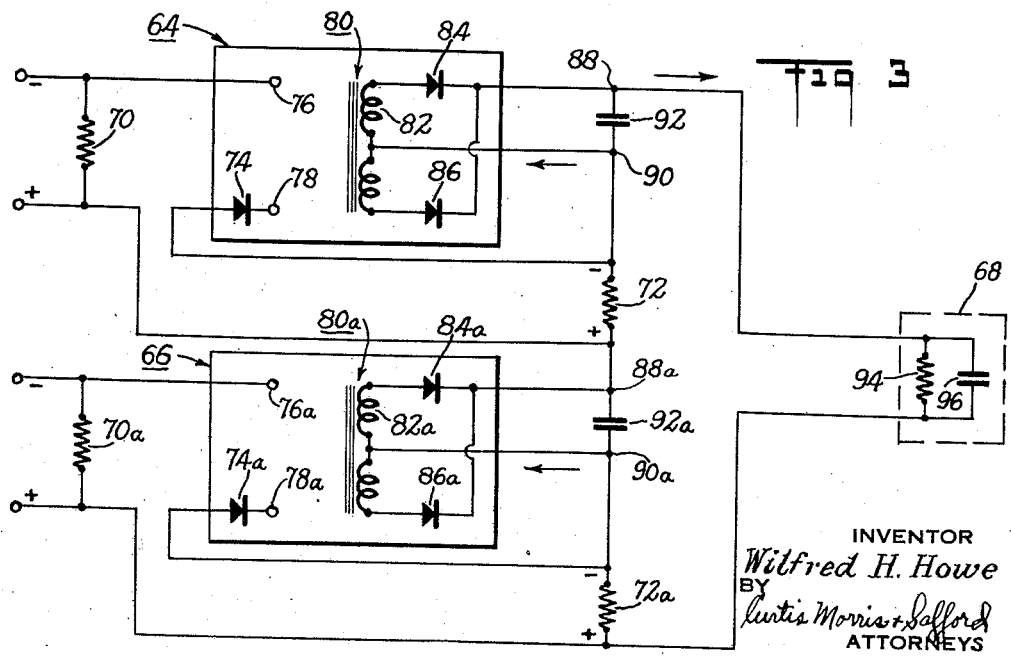
INVENTOR
*Wilfred H. Howe*
BY
*Curtis, Morris & Safford*
ATTORNEYS United States Patent Office 3,083,321
Patented Mar. 26, 1963

3,083,321
DOMINANT SIGNAL SELECTING APPARATUS
Wilfred H. Howe, Sharon, Mass., assignor to The Foxboro Company, Foxboro, Mass., a corporation of Massachusetts
Filed Mar. 22, 1960, Ser. No. 16,871
11 Claims. (Cl. 318—19)

This invention relates to electrical signal-selecting apparatus adapted to receive a plurality of input currents and to produce a single output current corresponding to the input current having the highest value.

In signal transmission systems such as are used in measuring or controlling industrial processes, it frequently is advantageous to provide equipment for automatically selecting the highest of several available measurement signals, this selected signal being fed for example to one or several electrically-operated devices forming part of the overall instrumentation system. In some cases it may be desirable to operate a single recorded or controller from the output of a selected one of several condition-measuring devices, depending upon which measuring device output at any moment has the highest or lowest magnitude. In other cases it may be desirable to provide two separate process controllers, each responsive to a different process condition such as flow rate and pressure, and to position a single flow-control valve in accordance with the controller output that at any given moment has the larger magnitude. Since the output signals of such condition-responsive devices or controllers frequently is in the form of an electrical current, as distinguished from an electrical voltage, it is important to provide signal-selection apparatus which is operable to select the highest one of several current signals.

Accordingly, it is an object of the present invention to provide signal-selecting apparatus that is superior to such apparatus provided heretofore. It is a more specific object of this invention to provide apparatus adapted to receive two or more current input signals, and to produce an output current signal corresponding in magnitude to the highest value of the several input signals. Other objects, advantages and aspects of the present invention will be in part apparent from, and in part pointed out in, the following description considered together with the accompanying drawings, in which:

FIGURE 1 is a schematic diagram showing a signal-selecting arrangement in accordance with the present invention;

FIGURE 2 is an equivalent circuit diagram of the arrangement shown in FIGURE 1; and FIGURE 3 shows a modified signal-selecting arrangement.

Referring now to FIGURE 1, there is shown in diagrammatic form a pair of conventional remote transmitter units 10 and 12 arranged to control the current flowing through respective transmission lines 14 and 16 in accordance with the magnitude of the conditions being measured by the transmitters. Current for the transmission lines is supplied by a pair of series-connected power supplies shown as batteries 18 and 20. Bridged across the ends of the transmission lines are rectifiers 22 and 24 which are connected in series with each other and with a load resistor 26, which may for example represent a recording or control instrument.

Transmitter 10 is a pressure-responsive device and comprises a bellows 28 to which the input pressure signal is applied through a conduit 30. The movable end of the bellows is connected to a rod 32 the remote end of which is connected to the armature of a rebalance motor 34 arranged to develop a force in opposition to that produced by the bellows. Rod 32 is pivotally linked to an arm 36 the upper end of which is pivoted at 38 and the lower end of which is coupled to a force-sensing device 40. This device includes electrical circuitry (not shown herein) arranged to produce changes in current in the winding of motor 34 and transmission line 14, in response to changes in the balance of forces applied to arm 36.

The force-sensing device 40 may be any one of various types of devices used for this purpose, e.g. it may include a transistor oscillator and amplifier circuit such as disclosed in copending application Serial No. 810,808, filed by John R. Cressey et al. on May 4, 1959, now Patent No. 3,051,933. Whenever the input pressure applied to bellows 28 changes, there will be a corresponding momentary unbalance of the forces applied to arm 36, and the resulting slight movement of this arm will operate the force-sensing device 40 to cause a change in the current flowing through the winding of motor 34. The change in this current will be in such a direction and of such a magnitude to rebalance the forces on the arm 36. With the high sensitivity normally provided in this type of feedback arrangement the transmitter 10 can be considered to be a "current source," in that the magnitude of its output current is effectively independent of changes in the load placed on the transmission line. In other words, the effective internal resistance of the transmitter is extremely high relative to the load resistance 26, which normally will be 100 ohms or so in most practical systems of this type.

The transmitter 12 is basically similar to transmitter 10, except that it is arranged to produce an output current corresponding to the difference between two pressures applied to input conduits 44 and 46. For this purpose, these conduits are connected to opposite sides of a diaphragm 48 mounted in a sealed chamber 50, and the center of the diaphragm is connected to rod 52 which is fastened to the armature of a rebalance motor 54. Rod 52 is linked to a pivotally mounted arm 55 which operates force-sensing device 56 to control the current flowing through motor 54 and transmission line 16, all as in transmitter 10. For specific details of a differential-pressure transmitter of this general type, reference is made to U.S. application Serial No. 760,946, filed by Everett O. Olsen et al. on September 15, 1958, now Patent No. 2,956,212.

To clarify the operation of this current-selection arrangement, portions of the apparatus of FIGURE 1 are presented in FIGURE 2 in "equivalent circuit" form. (For a discussion of such equivalent circuit presentations, see page 532 of "Applied Electronics," published in 1943 by the Massachusetts Institute of Technology.) In FIGURE 2, current source 60 represents transmitter 10, transmission line 14 and power supply 18, and current source 62 represents transmitter 12, transmission line 16 and power supply 20. Current sources 60 and 62 are symbolically shown as including zero-resistance voltages sources $E_1$, $E_2$ connected in series with respective internal resistances $R_1$, $R_2$. The magnitude of voltages $E_1$, $E_2$ are directly proportional to the magnitudes of the respective pressure inputs to transmitters 10 and 12, and the internal resistances $R_1$, $R_2$ are very large relative to the load resistance 26.

With this arrangement, the current flowing through the load resistance 26 always will be proportional to the larger one of the two currents produced by the sources 60 and 62. To demonstrate this, assume that the internal resistances $R_1$, $R_2$ are 9900 ohms, the load resistance 26 is 100 ohms and the voltages $E_1$, $E_2$ are 100 and 49.5 volts respectively. (The values given in the foregoing have been selected merely to simplify the mathematics of the circuit analysis.) Now considering for the moment that the output circuit of the lower source 62 is disconnected from rectifier 24, e.g. by breaking the circuit at the points marked "x," it will be evident that the current from the upper source 60 will flow through its internal resistance $R_1$, the load resistance 26, the lower rectifier 24, and back to the source 60. No current will flow through the upper rectifier 22 in this case because it is poled oppositely with respect to the polarity of voltage $E_1$. The magnitude of the current flowing through the load resistance 26 will, assuming that the rectifier 24 has zero resistance, be 10 milliamps (i.e. 100 volts divided by 10,000 ohms). This current will produce a one volt drop across the load resistance 26 and a 99 volt drop across internal resistance $R_1$, the drop across the lower rectifier 24 being zero.

If the output circuit of the lower source 62 now is reconnected across the rectifier 24, this will not affect the current flow through the load resistance 26. That is, with a zero voltage drop across the rectifier 24, the output of the lower source will effectively be short-circuited, and hence current will flow from $E_2$ through the internal resistance $R_2$ only in an amount sufficient to produce a voltage drop across $R_2$ of 49.5 volts, i.e. an amount equal to the voltage of the source $E_2$. The current flowing in the lower source 62 therefore will be 5 milliamps (49.5 volts divided by 9900 ohms). With 10 milliamps flowing through the load resistance 26, and 5 milliamps flowing in the lower source 62, it will be evident that a current of 5 milliamps will be flowing up through the lower rectifier 24.

If the input pressure applied to the upper transmitter is increased, which thereby increases the voltage of the symbolic source $E_1$, the current flowing through the load 26 will correspondingly increase. The current flowing through the lower source 62 will remain unchanged, however, because there still is effectively no voltage drop across its output circuit. Thus, the additional current flowing through the load resistance 26 merely will pass through the lower rectifier 24 and thence back to the upper source 60.

If the differential-pressure input to the lower transmitter is increased, there will be a corresponding increase in the current flowing through the internal resistance $R_2$ of source 62. However, if the increase in input is relatively small so that $E_2$ still is less than $E_1$, the load current through resistor 26 will remain constant. This is because current will continue to flow up through lower rectifier 24, although in a decreased amount, and hence there still will be effectively zero voltage drop across the lower rectifier. If the input to the lower transmitter is increased to a magnitude such that $E_1$ and $E_2$ are equal (100 volts), then the current flow through the lower source 62 and load resistance 26 will become equal (at essentially 10 milliamps), and current will cease to flow through the lower rectifier 24.

If the input to the lower transmitter is still further increased to a level such that $E_1$ is larger than $E_2$, source 62 will control the current flowing through the load resistance 26 just as source 60 previously had controlled this current. That is, the increased current flowing out of the lower source 62 will pass through the upper rectifier 22 and back through the load resistance 26 to the source 62, and the magnitude of this current will be proportional to the input ($E_2$) to the lower transmitter. The current flowing in the upper source 60 will remain at 10 milliamps since the voltage drop across rectifier 22 will be effectively zero under these conditions.

Therefore, the circuit arrangement shown in FIGURES 1 and 2 serves to select one or the other of the output currents of the sources 60 and 62, in accordance with which of these currents is the larger, and thus produces an output current through the load resistance 26 in accordance with the magnitude of the input to the selected transmitter.

In some instrumentation systems, it may be desirable to select the larger output current of a pair of electrical process controllers, rather than transmitters as described in FIGURE 1. These controllers frequently comprise negative feedback amplifiers which can be considered to be "current sources." Consequently, FIGURE 2 also represents a selection arrangement for such a pair of controller amplifiers as indicated by the blocks 60 and 62. The primary elements for producing the input signals to drive the controller amplifiers are, of course, not shown in FIGURE 2, but such signals can be derived in the usual way from many different types of sensing elements or transducers, etc., and may for example be derived from a transmitter unit of the type shown at 10 or 12 in FIGURE 1.

FIGURE 3 shows another form of the invention wherein the larger output current of a pair of amplifiers 64 and 66 is selected and fed to a load 68. These amplifiers are identical in construction and hence only one will be described hereinbelow.

Referring now to the upper amplifier 64, an input signal is derived across an input resistor 70 in accordance with the flow of current produced by any conventional current source, such as the transmitters 10 or 12 referred to hereinabove. This input signal is connected in series-opposition to a feedback signal developed across a current-feedback resistor 72, and the difference between these two signals is fed through a rectifier 74 to the input terminals 76 and 78 of the amplifier.

The amplifier 64 is a conventional multi-stage high-gain A.-C. amplifier having a modulator (not shown) to convert the D.-C. difference signal to alternating current for amplification purposes. The last stage of the amplifier includes an output transformer 80 having a center-tapped output winding 82 the ends of which are connected through respective rectifiers 84 and 86 to one output terminal 88. The other output terminal 90 is connected to the center tap of winding 82, and a filter capacitor 92 is bridged across the output terminals in the usual way. Connected in series with the output terminals is the feedback resistor 72, the output terminals 88a and 90a of the lower amplifier 66, the feedback resistor 72a of the lower amplifier, and the load resistor 94 with a filter capacitor 96.

With this arrangement, the output current flowing through the load 94 will be proportional to the larger one of the input signals applied to the amplifiers 64 and 66. The operation of this circuit can be understood by first considering that the lower amplifier 66 is temporarily deactivated, in which event the high gain of the upper amplifier 64 causes the feedback voltage across resistor 72 to be substantially equal to the input voltage across resistor 70. Since the output current of the upper amplifier also flows through the feedback resistor 72a of the lower amplifier (the current path being completed through the low-resistance circuit of transformer 80a and rectifiers 84a and 86a), it will be apparent that the feedback voltage for the lower amplifier will be equal to the feedback voltage for the upper amplifier, and hence the lower feedback voltage will be larger than the input voltage applied to the lower amplifier. Under these conditions, no current can pass through the rectifier 74a to the input terminals 76a and 78a of the lower amplifier, since this rectifier will be poled oppositely with respect to the polarity of the difference signal between the feedback and input voltages for the lower amplifier. Therefore, if the lower amplifier 66 now is reactivated, it will be evident that it will not contribute any output current to the load 94, because the signal applied to its input terminals will be zero.

Alternatively, if the input voltage across the lower resistor 70a is larger than that across the upper resistor 70, the current flowing through the load 94 will correspond to the lower input voltage, and the feedback voltage for the upper amplifier will be larger than its input voltage. Thus, no input signal will pass through rectifier 74, and the upper amplifier will not contribute any current to the load. Accordingly, just as in the FIGURE 1 construction, it will be apparent that this FIGURE 3 feedback arrangement serves to effectively isolate one of the current sources from the load when that source receives an input signal smaller than required to produce an output current equal to the current flowing through the load. The amplifiers 64 and 66 may be any one of many conventional types using vacuum tubes, transistors or magnetic amplifying devices. With magnetic amplifiers, the current selection may also be obtained, for example, by causing the load current to flow through feedback windings on both amplifiers.

Although preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Electrical selection apparatus comprising a plurality of signal sources arranged to produce output currents and each having a pair of output terminals, a plurality of rectifier means each connected between the output terminals of a respective one of said signal sources and arranged to permit the flow of current in one direction directly between the corresponding output terminals and to prevent the flow of current in the other direction between said terminals, an electrical load element to receive current produced by said signal sources, and circuit means connecting said rectifier means in series with each other and with said electrical load element, all of said rectifier means being polarized in the same direction with respect to the series circuit formed by said circuit means.

2. Apparatus as claimed in claim 1, wherein the effective internal impedances of said signal sources are substantially greater than the impedance of said electrical load element.

3. Apparatus as claimed in claim 2, wherein said signal sources comprise condition-responsive transmitters connected to said load element by respective transmission lines.

4. Apparatus as claimed in claim 3, wherein at least one of said transmitters includes a balanceable member with means to apply a force thereto in accordance with a condition being measured, motor means energized by the current flowing through said transmission line to produce a rebalance force on said balanceable member, and force-sensing means operable by said balanceable member to control the current through said motor means and the corresponding transmission line.

5. Signal-selecting apparatus comprising first and second current sources arranged to receive respective independent input signals, circuit means connecting the outputs of said current sources in series, a load element connected in series with said source outputs, and first and second isolating circuit means connected to said source outputs respectively to receive current flowing through said load element, said isolating circuit means including means arranged to effectively disable either one of said sources when said one source receives an input signal smaller than that required to produce an output current equal in magnitude to the current flowing through said load element.

6. Apparatus responsive to at least two inputs and arranged to produce a single output corresponding to one of said inputs, comprising, in combination, a plurality of amplifiers, circuit means connecting the output circuits of said amplifiers in series, an electrical load connected in series with the output circuits of said amplifiers to receive the current produced thereby, and inverse feedback means for developing negative feedback signals responsive to the current flowing through said electrical load and for coupling said feedback signals respectively to the inputs of said amplifiers in opposition to the signals fed thereto.

7. Apparatus responsive to at least two electrical input signals and arranged to produce a single output signal corresponding to one of said input signals, comprising, in combination, a plurality of amplifiers each adapted to receive a respective one of said input signals, circuit means connecting the outputs of said amplifiers in series, an electrical load connected in series with the outputs of said amplifiers, and current inverse feedback means for each of said amplifiers respectively, said feedback means including means to effectively disable any of said amplifiers receiving an input signal insufficient to produce in the output of that amplifier a current at least equal to the current flowing through the load.

8. Apparatus as claimed in claim 7, wherein said amplifiers are arranged as process controllers.

9. Electrical apparatus adapted to receive two D.-C. input signals and to develop a signal output current proportional in magnitude to the larger one of said input signals, comprising first and second amplifiers, an electrical load to be supplied with current from said amplifiers, first and second current inverse feedback means for each of said amplifiers respectively, said feedback means including means to feed the feedback signals to the respective amplifier inputs in series-opposition to the corresponding input signal so as to develop a difference signal to be applied to each amplifier, circuit means connecting the outputs of said amplifiers in series with each other and with said feedback means and said load, and first and second rectifier means connected in the input circuits of said amplifiers respectively to isolate either of said amplifiers from its corresponding difference signal when that difference signal has a predetermined polarity.

10. Apparatus as claimed in claim 9, wherein said feedback means comprises first and second resistors connected in series with said load to develop corresponding feedback voltages.

11. Apparatus as claimed in claim 10, wherein said amplifiers are of the A.-C. type, each of said amplifiers including rectifier means in its output circuit to convert the amplified A.-C. signal to a corresponding D.-C. current.

References Cited in the file of this patent

UNITED STATES PATENTS

| | | |
|---|---|---|
| 2,455,364 | Hays | Dec. 7, 1948 |
| 2,560,337 | Fouassin | July 10, 1951 |
| 2,849,669 | Kinkel | Aug. 26, 1958 |